T. C. MARSHALL.
MOLDING CORE.
APPLICATION FILED AUG. 8, 1921.

1,392,072.

Patented Sept. 27, 1921.

INVENTOR
THOMAS C. MARSHALL
BY R.H.Waters
ATTORNEY

UNITED STATES PATENT OFFICE.

THOMAS C. MARSHALL, OF MOUNT SAVAGE, MARYLAND, ASSIGNOR TO KELLY-SPRINGFIELD TIRE COMPANY, OF CUMBERLAND, MARYLAND, A CORPORATION OF NEW JERSEY.

MOLDING-CORE.

1,392,072.           Specification of Letters Patent.      Patented Sept. 27, 1921.

Application filed August 3, 1921. Serial No. 489,587.

*To all whom it may concern:*

Be it known that I, THOMAS C. MARSHALL, a citizen of the United States, residing at Mount Savage, in the county of Allegany and State of Maryland, have invented a certain new and useful Improvement in a Molding-Core, of which the following is a specification.

This invention relates to the art of molding or vulcanizing an article of manufacture formed in whole or in part of rubber wherein it is desired to provide within said article a void which is rigidly supported against internal collapse throughout the vulcanizing process. The invention, by way of illustration only, is shown and described as particularly applied to the formation of semi-solid tires, such, for instance, as those designed for use on heavy duty motor trucks.

In the manufacture of semi-solid tires the prevailing practice resorted to in the formation of internal voids for increasing their resiliency, as well also as for economizing the stock used in their manufacture, implies the employment of rigid internal supports to maintain the voids during vulcanization; the internal support being thereafter withdrawn in an appropriate manner to leave the void free to function as a resilient chamber. In the choice of suitable internal supports the following types are most common: rigid non-destructible mandrels which must be laboriously extracted; initially rigid mandrels which are destructible within the voids, but must be extracted, for instance, those made of material such as bismuth, lead and tin, so compounded that they melt under the heat of vulcanization after the body of the structure has become set; and lastly, supports comprising inflatable means whereby a fluid pressure may be maintained during vulcanization, these last named means usually remaining within the structure in a deflated condition.

Being cognizant of the above and in recognition of the inherent defects of such expedients from the viewpoint of manufacturing difficulties, or economy, or both, the present invention has sought to provide an internal support embodying physical effectiveness with economy.

It is, therefore, the principal object of this invention to provide a shell-like internal support composed of material which is initially sufficiently rigid to withstand the heat and pressure of vulcanization, yet have its properties subsequently so modified by the heat treatment as to be readily pulverized into harmless particles within the void it creates. The destruction being accomplished by impact, as by the use of the tire in actual service, whereby the resiliency of the mass will be restored without the necessity of removing the form before the tire is put into service.

An additional object is to form the shell-like support of material that will be so completely disintegrated by the incidental shocks of service as to obviate all possibility of internal injury by cutting or abrading, and at the same time to set up no chemically deleterious reaction within the mass.

With these and additional objects in view, as more fully herein set forth, the invention consists of the novel means provided and the associated use thereof in combination with its particular environment.

Referring to the drawings.

Figure 1:
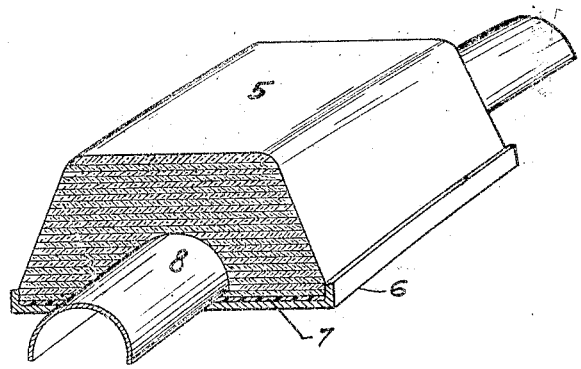
Figure 1 illustrates a preferred form and placement of a shell core within a laminated tire structure. The view being a perspective of a fragment of a tire.

In Fig. 1 the tire 5 is formed of thin strips of unvulcanized rubber wound upon a metallic base ring 6, and usually seated in a strata of hard rubber 7. As this tire is formed direct upon the unitary rim the void must be created concurrent with the fabrication of the structure, as by omitting a part of the winding adjacent the shell core 8, which, of course, is placed upon the rim prior to the winding operation. The core 8 is illustrated as semi-circular in cross section and formed as an annulus laid snugly against the base coat 7.

Figure 2:
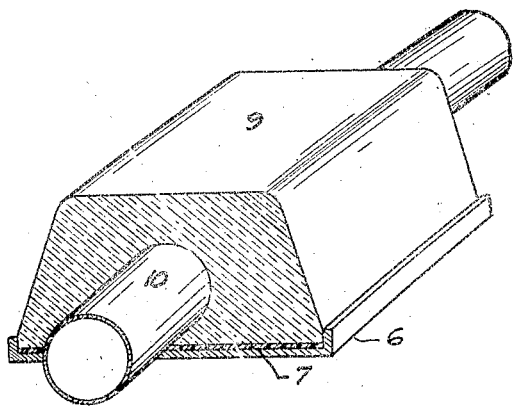
Fig. 2 is similar to Fig. 1 except the tire structure illustrated is of the usual extruded type with the void farther from the rim.

In Fig. 2 the tire 9 is illustrated as of the extruded type wherein the material is forced in indefinite straight lengths through a die which is fashioned to impart the void. This extruded tire is afterward cut to gage and formed as an annulus about the customary rim 6 and seated in the hard base 7. The core 10 for this type is illustrated as an inclosed sectional form and is introduced in an appropriate manner within the void prior to bending the tire around the rim. For the purpose of introducing the core within the void it may be constructed in straight lengths of material sufficiently flexible to be bent to the required curvature. The core, if in straight lengths may be inclosed within a sleeve running lengthwise of the bore of the extruding machine and fed through the portion of the die that creates the void in the flowing mass constituting the tire; thereby resulting in the formation of the entire structure with its reinforced void direct from the machine.

The core, 8 and 10, is preferably made of a suitable semi-cured rubber, or the like, and is only sufficiently rigid to stand the stresses set up within the mass of rubber during the curing. The heat of curing will render the core compound hard and extremely brittle whereby it may be readily disintegrated in service. The chemical proportion of the core are not an element of this invention and may be fixed at will to impart the physical properties desired for any given manufacturing condition and will depend upon the particular proportions of the void to be supported and upon the duration and intensity of the curing heat and bear a definite relation to the molding pressure; all of which is a matter of detail readily ascertained by those well skilled in the art.

Although the illustrative embodiment of this invention has taken a particular form it will be understood that it may be practised through a wide range without departing from the scope and spirit of the appended claims.

Claims—

1. A molding support for preserving a void in the interior of an article of manufacture consisting of vulcanizable material, comprising a formed shell-like hollow structure composed of partially vulcanized material and adapted to become brittle and readily destroyed after the article supported is vulcanized.

2. A molding support of the character described, comprising a formed shell-like structure of partially vulcanized material adapted to preserve a void interiorly of an annulus of rubber during vulcanization under heat and pressure, said support being adapted to become hard and brittle under the heat of vulcanization while serving as a support whereby its destruction by impact is facilitated.

3. A molding support of the character described, comprising a shell-like hollow annulus composed of a formed substance having resilient properties, said support being adapted to become less resilient under subsequent heat whereby its destruction by impact is facilitated.

4. A molding support of the character described comprising a brittle shell-like hollow annulus adapted to fill and support an internal void in a tire structure during vulcanization whereby the void is preserved, said support being readily destructible under impact whereby the resiliency of the tire is increased.

5. The combination with an annular steel rim having a vulcanizable structure thereon, of a hard shell-like annular support within said structure forming a void therein and adapted to be readily destroyed by impact after vulcanization whereby the resiliency of the structure is increased.

6. The process of forming an article of manufacture composed of vulcanizable material comprising the following steps: (a) providing said article with an internal void (b) filling said void with a hollow shell-like support adapted to preserve its integrity during vulcanization (c) vulcanizing the article interiorly supported whereby the support becomes brittle (d) breaking the brittle support after vulcanization whereby the void contributes to the resiliency of the article.

In testimony whereof I affix my signature.

THOMAS C. MARSHALL.